United States Patent [19]
Gottlieb

[11] Patent Number: 5,920,621
[45] Date of Patent: Jul. 6, 1999

[54] SYSTEM AND METHOD FOR DISTRIBUTING CALLS TO CUSTOMER SERVICE OPERATORS BASED ON AUTOMATIC DETERMINATION OF OPERATOR AVAILABILITY

[75] Inventor: Louis G. Gottlieb, Colorado Springs, Colo.

[73] Assignee: MCI Communications Corporation, Washington, D.C.

[21] Appl. No.: 08/632,197

[22] Filed: Apr. 15, 1996

[51] Int. Cl.⁶ .......................... H04M 3/00; H04M 15/00; H04M 3/42; H04M 7/00
[52] U.S. Cl. .......................... 379/265; 379/113; 379/133; 379/210; 379/220; 379/308; 379/309
[58] Field of Search ...................................... 379/265, 266, 379/309, 210, 211, 214, 113, 133, 134, 135, 136, 246, 247, 308, 219, 220

[56] References Cited

U.S. PATENT DOCUMENTS

| | | | |
|---|---|---|---|
| 5,062,103 | 10/1991 | Davidson et al. | 370/270 |
| 5,168,515 | 12/1992 | Gechter et al. | 379/265 |
| 5,271,058 | 12/1993 | Andrews et al. | 379/210 |
| 5,291,551 | 3/1994 | Conn et al. | 379/265 |
| 5,392,345 | 2/1995 | Otto | 379/220 |
| 5,459,780 | 10/1995 | Sand | 379/265 |

*Primary Examiner*—Harry S. Hong

[57] ABSTRACT

System and method for distributing calls to customer service operators, particularly home operators. The present invention provides a telecommunications service provider's network with intelligence to monitor the current status and availability of home operators, and to determine the appropriate routing of a customer service call. By enabling the network to monitor operator availability status, only a single telephone line to a home operator is required, and notification of availability to answer calls is not required to be performed by the home operator.

8 Claims, 9 Drawing Sheets

SYSTEM AND METHOD FOR DISTRIBUTING CALLS TO CUSTOMER SERVICE OPERATORS BASED ON AUTOMATIC DETERMINATION OF OPERATOR AVAILABILITY

BACKGROUND OF THE INVENTION

1. Field of the Invention

The present invention relates generally to telecommunications systems. More particularly, the present inventions relates to a system and method for distributing calls among a plurality of operators. Still more particularly, the present invention relates to distributing calls to home operators and customer service/operator center operators.

2. Related Art

Many companies provide customer services by employing telephone operators to staff a Customer Service/Operator Center (CS/OC). For example, some companies use a CS/OC to handle customer inquiries, and maintenance or service problems. A customer calls a designated service number to speak with a CS/OC Operator. The designated service number may be, for example, a Direct Distance Dialing (DDD) number. One example of a designated service number is a "1-800" customer service number. Other companies use a CS/OC for catalog sales. In such a scenario, a customer calls the designated telephone number and places an order from the company's catalog.

In a typical CS/OC, the operators staff telephone lines that are directly connected to an Automatic Call Distributor (ACD). An ACD is a conventional telephone switch that may be customized for the particular CS/OC through the use of software. The software enables the ACD to provide call queuing and selective distribution functions that satisfy the requirements of a particular CS/OC. The ACD is typically connected to a telecommunications service provider's network so that customers have ubiquitous telephone access to the CS/OC. Such access may be provided by implementing a customer service number, such as a "1-800" number.

A company may also use the service of a Home Operator to augment or replace the services of operators staffing its CS/OC. A Home Operator serves the same function as an operator working in the CS/OC; however, a Home Operator performs this function from home, using telephone lines connected to the operator's home. A Home Operator's telephone line is generally provided by a Local Exchange Carrier (LEC) that has access to the telecommunications service provider's network via the provider's switch. In this manner, telephone access from the customers to the Home Operators is achieved through the telecommunications service provider's network, via the provider's switch, to the LEC to which the Home Operator is connected. The Home Operator thus does not require use of, or connection to, an ACD.

Use of Home Operators is advantageous for several reasons. It lowers overhead costs associated with a CS/OC. For example, it reduces the size of physical facilities by allowing operators to work from their own home. Additionally, it reduces the demand for ports on expensive ACD's since switching is provided by the telecommunications service provider's switch that is connected to the Home Operator's LEC. A company may, for example, use Home Operators to handle overflow from its CS/OC ACD, thereby reducing call blockage and call waiting without having to add another ACD. Use of Home Operators has the added advantages of more flexible employee scheduling, parttime work, and reduced employee commuting.

However, a conventional Home Operator system requires that the operator's home be equipped with two telephone lines. The first line is used as a voice line for the Home Operator to conduct customer calls. The second line is used to notify the telecommunications service provider's network of the availability of the Home Operator. This notification is necessary so that the telecommunications service provider's network knows when a particular Home Operator is available to answer a call, so that a call does not get routed to an unavailable Home Operator. In a conventional Home Operator system, the Home Operator must perform the function of notifying the telecommunications service provider's network of their availability to answer a call. The second telephone line is used to provide notification to the network of when the Home Operator is busy with a call, when the current call is finished and the Home Operator is available to answer a subsequent call, and when the Home Operator will be unavailable to take any calls.

Thus, there is a need for a Home Operator system that allows a Home Operator to provide services through the use of only a single telephone line to the operator's home, without having to use a second telephone line to provide notification of their availability.

SUMMARY OF THE INVENTION

The present invention is a system and method for distributing calls among a plurality of operators that may include Home Operators and Customer Service/Operator Center (CS/OC) Operators. The present invention monitors the current status and availability of the operators, and determines the appropriate routing of a customer service call. By enabling a network to monitor operator availability status, only a single telephone line to a Home Operator is required.

In one aspect of the invention, a method for distributing calls among a plurality of operators is provided. The method incudes identifying an operator from among the plurality of operators that has a status of available, indicating the operator can answer a current call, and routing the current call to the identified operator. The status of the operator is changed to non-available indicating that the operator cannot answer a subsequent call. Upon completion of the current call by the operator, the status of the operator is changed to available indicating that the operator is now available to answer the subsequent call. The current call may be routed to a home operator via a single telephone line. Alternatively, the current call may be routed to a customer service/operator center operator via an automatic call distributor.

An available operator may be identified by accessing a force management database to identify a set of on-duty operators, i.e., operators that are scheduled to work at the time a current call is received. Operator availability status information may then be processed for this set of on-duty operators.

The status of the operator may be changed to non-available by receiving a call routing message indicating that the call has been routed to the operator, and processing the call routing message to change the status of the operator from available to non-available. A call routing system is notified of the change in status of the operator.

The status of the operator may be changed to available at the completion of the current call by receiving a call detail record indicating completion of the current call by the operator, and processing the call detail record to change the status of the operator from non-available to available. A call routing system is notified of the change in status of the operator.

Alternatively, the status of the operator may be changed to available at the completion of the current call by receiving a message from an automatic call distributor that the current call is complete, and that a customer service/operator center operator is available. The message is processed to change the status of the customer service/operator center operator from non-available to available, and a call routing system is notified of the change in status of the operator.

The method of the present invention may also determine if a ring-no-answer condition exists for a home operator. If the ring-no-answer condition does exist, a next operator that has a status of available is identified and the current call is routed to the next operator.

The method of the present invention may also determine if a busy signal condition exists for the home operator, indicating that the home operator is on a local exchange carrier call. If the busy signal condition does exist, the status of the home operator is changed to non-available, and a next operator that has a status of available is identified. The current call is routed to the next operator. The busy signal condition is periodically checked. When the busy signal condition no longer exists, the status of the home operator is changed to available, indicating that the home operator is available to answer a call.

In a further aspect of the invention, a system for distributing calls among a plurality of operators is provided. The system includes call routing means for providing call routing instructions to a switch through a data access point. An intelligent routing host that receives and processes operator availability data is communicatively coupled to the call routing means. A network information concentrator receives and processes call detail records generated by the switch, and operator availability messages generated by the data access point, to generate operator availability data that is forwarded to the intelligent routing host. The intelligent routing host processes the operator availability data and notifies the call routing means which of the plurality of operators has a status of available. The call routing means instructs the data access point to route a current call to an operator that has a status of available.

In yet a further aspect of the invention, a system for distributing calls among a plurality of operators is provided that includes a monitoring means and a call routing means communicatively coupled to the monitoring means. The monitoring means monitors the availability of the plurality of operators by maintaining a status for each of the operators. The monitoring means also identifies an operator from the among the plurality of operators that has a status of available, indicating that the operator can answer a call. The call routing means routes the call to the operator identified by the monitoring means. The monitoring means may include an intelligent routing host for maintaining the status of the plurality of the operators. The monitoring means may also include a network information concentrator communicatively coupled to the intelligent routing host for collecting call detail records used in maintaining the status of home operators.

Features and Advantages

One feature of the present invention is that it automatically provides notification of the availability of an operator. Notification of availability to answer calls is not required to be performed by the Home Operators.

A further feature of the present invention is that it can be used to distribute calls among a plurality of operators that includes both Home Operators and Customer Service/Operator Center (CS/OC) Operators. It is yet a further feature of the present invention that it can be used to distribute calls to Home Operators as overflow when a CS/OC Operator is not available.

It is yet a further feature of the present invention that it detects when a busy signal condition exists, such as when a Home Operator is on a Local Exchange Carrier (LEC) call, and routes the current call to a next available operator.

A still further feature of the present invention is that is detects when a ring-no-answer condition exists for a Home Operator, and routes the current call to a next available operator.

An advantage of the present invention is that only a single telephone line is required for a Home Operator. Accordingly, a further advantage of the present invention is that it eliminates the added expense of a second telephone line for each Home Operator.

A further advantage of the present invention is that a Home Operator is not required to perform notification of their availability and current status. A still further advantage of the present invention is that the telecommunications service provider's network automatically monitors the availability status of the Home Operators, and routes calls accordingly.

Another advantage of the present invention is that it can monitor availability of operators connected to an Automatic Call Distributor (ACD).

A still further advantage of the present invention is that it can be customized to distribute calls to Home Operators and CS/OC Operators based upon a company's requirements. An additional advantage is that the present invention can be used to distribute calls for a variety of purposes. For example, the present invention can be used by a company for customer inquiries, maintenance or service problems, or for catalog sales.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview

In a typical scenario in which the present invention is used, a customer needing service from a company will call a designated customer service number, such as a toll-free "1-800" number. Such a customer is shown as 102 in FIG. 1. The customer's telephone is connected to a Local Exchange Carrier (LEC) 104. LEC 104 provides access to a telecommunications service provider's network (hereinafter referred to as "the network") through an originating switch 106, such as the provider's Originating Class 3 Switch. Originating switch 106 is the entry point of the customer service call into the network. Originating switch 106 has a data link to a Data Access Point (DAP) 110. In a manner similar to a conventional Service Control Point (SCP), DAP 110 is typically a large processor-based database that incudes customer profile information. DAP 110 provides network routing and call processing instructions, and controls the routing of calls between network switches. DAP 110 may also block a call if it is unauthorized, or if network conditions warrant such blocking.

Figure 1:
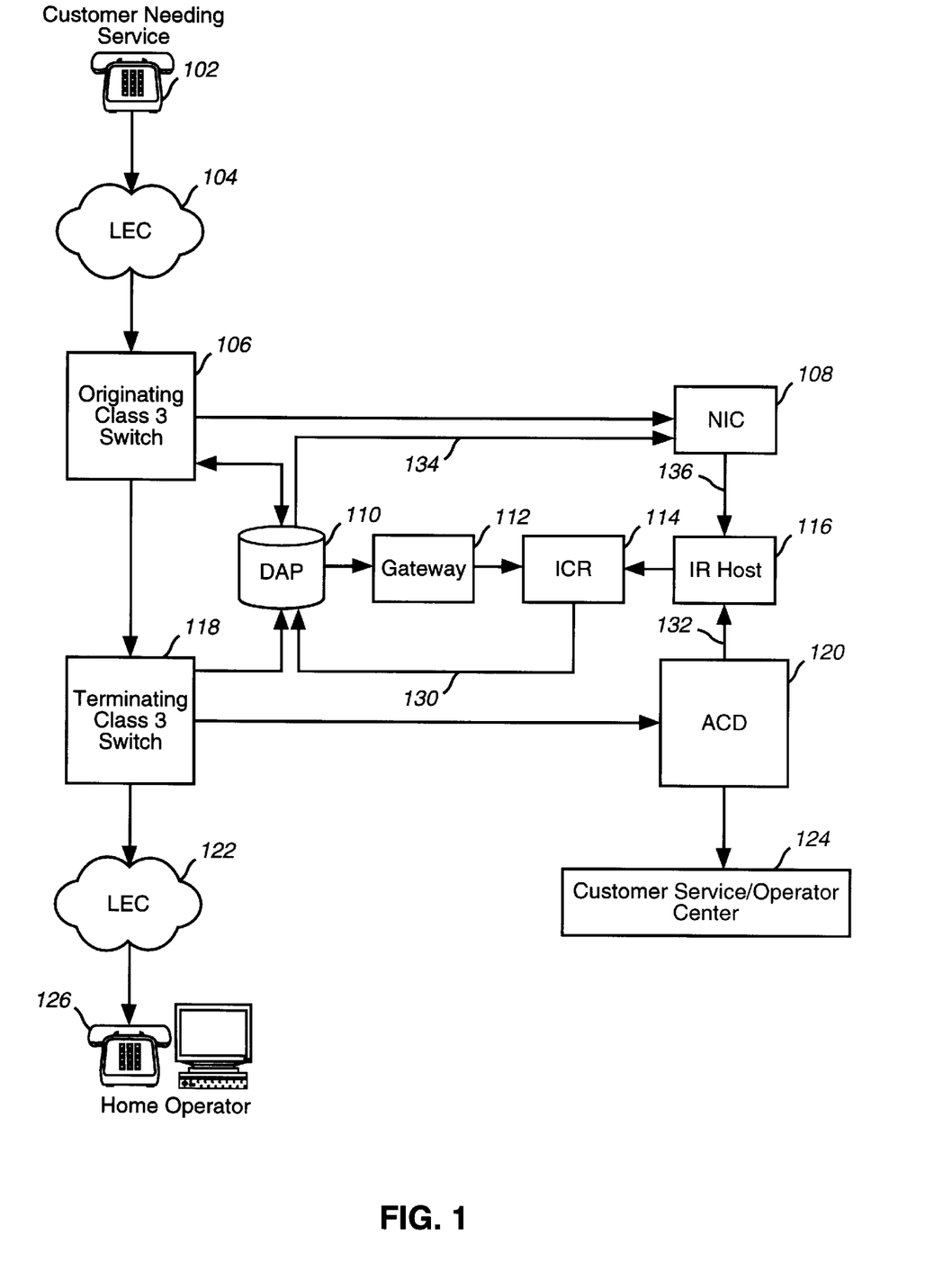
FIG. 1 shows a block diagram that illustrates a network system architecture of the present invention.

When customer 102 places the call to the designated customer service number, originating switch 106 queries DAP 110 to determine where to route the call. DAP 110 will recognize the designated customer service number from its database as a specific customer service call requiring further processing. The present invention provides a system and method for processing such customer service calls, so that they are distributed among a plurality of operators, particularly Home Operators and CS/OC Operators.

Through the use of the present invention, only a single telephone line is required for a Home Operator. A second telephone line is not required for notification by the Home Operators of their availability and status. The present invention automatically provides notification of the availability of an operator so that notification of availability to answer calls is not required to be performed by the Home Operators. The present invention automatically monitors the availability status of the Home Operators, and routes calls accordingly. The present invention can also be used to monitor the availability status of CS/OC Operators, and route calls based upon this information. For example, the present invention can be used to route calls to Home Operators as overflow when a CS/OC Operator is not available.

2. System Description

With reference to FIG. 1, a block diagram is shown that illustrates a network system architecture of the present invention. When DAP 110 identifies a current call requiring further processing, DAP 110 queries an Intelligent Call Routing (ICR) System 114 for routing instructions for the current call. DAP 110 accesses ICR 114 through a gateway 112 that provides security and data translation.

ICR 114 identifies an available operator from a pool of operators that includes Home Operators (shown generally at 126) and CS/OC Operators (shown generally at 124). ICR 114 provides the call routing instructions for the available operator, as shown generally at 130. To route a call to Home Operators 126, DAP 110 instructs originating switch 106 to route the call via a terminating switch 118, such as a Terminating Class 3 Switch, and a LEC 122. Home Operator 126 may be accessed by a conventional Direct Distance Dialing (DDD) number provided by LEC 122. LEC 122 may be connected to terminating switch 118 by a conventional Feature Group D (FGD) line. To route a call to CS/OC Operators 124, DAP 110 instructs originating switch 106 to route the call through terminating switch 118 to an Automatic Call Distributor (ACD) 120. Individual CS/OC Operators 124 are accessed through individual switch ports on ACD 120. ICR 114 determines whether to route the current call to a particular Home Operator 126 or to a particular port on ACD 120. This determination is made by ICR 114 using data received from an Intelligent Routing Host (IR Host) 116. IR Host 116 collects data from the network to monitor and process the availability status of operators.

IR Host 116 receives data from ACD 120. ACD 120 provides call queuing and call distribution among operators at the CS/OC. ACD 120 may be connected via a Direct Access Line (DAL) to terminating switch 118. ACD 120 compiles data regarding its port utilization and availability (shown generally at 132). This data is sent to IR Host 116, for example via a printer port on ACD 120. In this manner, IR Host 116 collects data that relates to the availability status of CS/OC Operators 124.

IR Host 116 also collects data that relates to the availability status of Home Operators 124. This is accomplished through use of a Network Information Concentrator (NIC) 108. As will be explained more fully below, NIC 108 collects and processes various records and messages generated by elements of the network, and forwards only the required data to downstream call processing applications. For example, NIC 108 receives a call routing message from DAP 110 that indicates that a call has been routed to the operator (shown generally at 134 and discussed in more detail with respect to FIG. 7) In the present invention, NIC 108 forwards data regarding Home Operator availability status to IR Host 116 (shown generally at 136).

Figure 2:
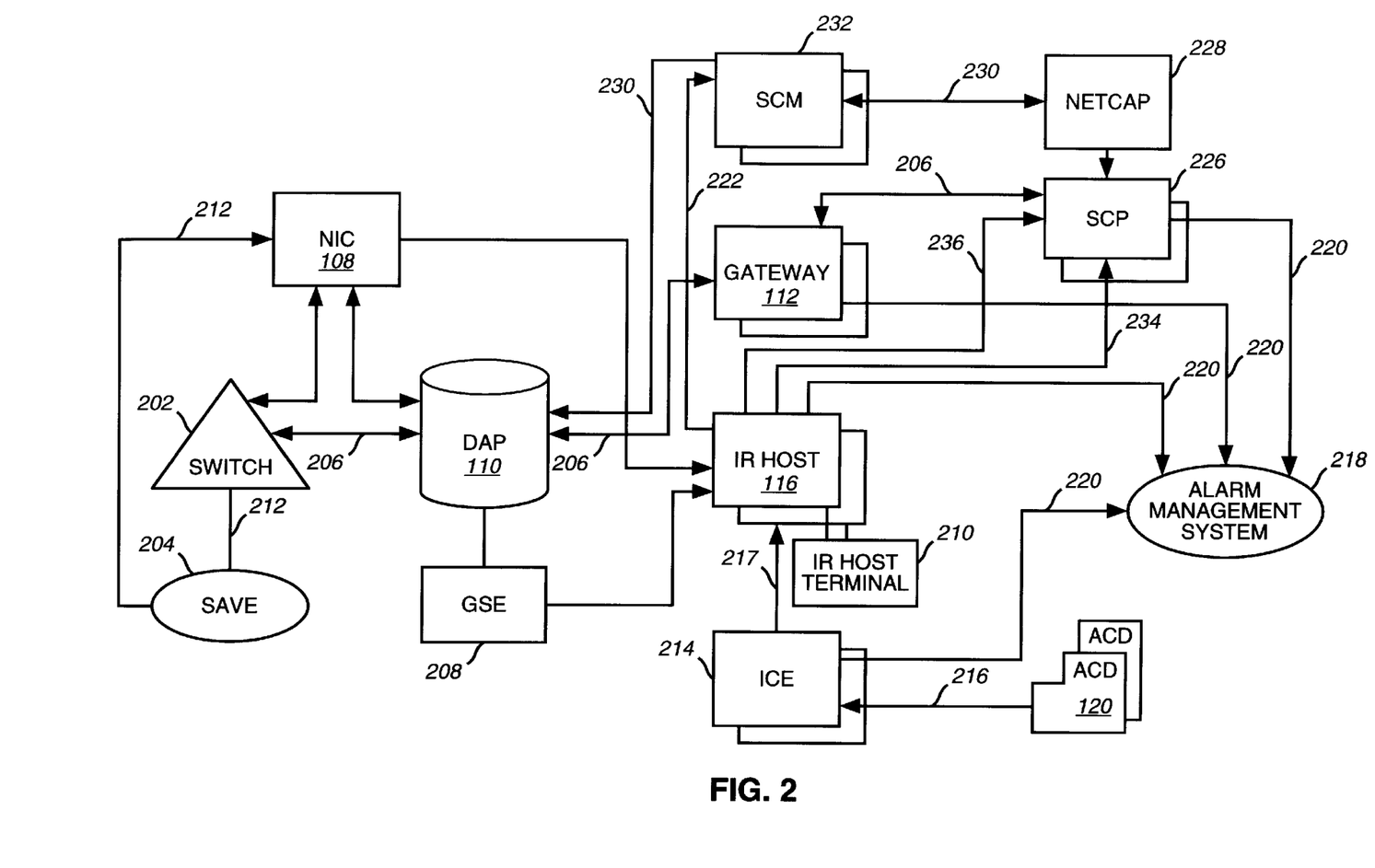
FIG. 2 shows a more detailed block diagram that illustrates the network system architecture shown in FIG. 1.

Turning now to FIG. 2, a more detailed block diagram is shown illustrating the network system architecture of FIG. 1. DAP 110 is shown communicatively coupled to a switch 202, which may be an originating switch (such as originating switch 106) or a terminating switch (such as terminating switch 118). Element 206 represents a Call Route Request and Response that is transmitted between DAP 110 and switch 202. DAP 110 may be, for example, a cluster of VAX 6610 computers. Switch 202 may be, for example, a DEX 600E switch, manufactured by Digital Switch Corporation, or alternatively a DMS 250, manufactured by Northern Telecom Corporation. Switch 202 may also be an international switch, such as one provided by Ericcson Limited. Switch 202 has a Storage and Verification Element (SAVE) 204 associated with it. A particularly preferred configuration for SAVE 204 is described in co-pending U.S. patent application Ser. No. 08/438,931, filed May 10, 1995, the entirety of which is incorporated herein by reference. Each switch in the network has a SAVE associated with it.

The function of SAVE 204 is to receive and buffer Call Detail Records (CDR), shown generally as 212, generated by switch 202. The CDR's contain information used by various network elements. For example, originating switch 106 issues a CDR when the customer service call made by customer 102 is complete. The information contained in such a CDR incudes the destination for the call, such as a particular Home Operator 126. As shown in FIG. 2, CDR 212 is received by NIC 108. CDR 212 is part of the information transmitted from NIC 108 to IR Host 116. Information is also transferred from DAP 110 to a Generalized Statistics Engine (GSE) 208. GSE 208 provides reporting of DAP call processing transactions, and forwards DAP Traffic Statistics to IR Host 116. A particularly preferred configuration for GSE 208 is described in co-pending U.S. patent application Ser. No. 08/438,918, filed May 10, 1995, the entirety of which is incorporated herein by reference.

FIG. 2 illustrates the four primary Intelligent Call Routing (ICR) system platforms that are used to implement the present invention: (a) an in-network Service Control Point (SCP) 226; (b) gateway 112; (c) IR Host 116; and (d) an ICR Customer Element (ICE) 214. Each of these system platforms will be described in turn below.

(a) Service Control Point (SCP) 226

SCP 226 may be configured as a cluster of processors or computers, such as those manufactured by Stratus. SCP 226 is programmed to provide the call-by-call routing services that are at the core of ICR 114. SCP 226 responds to queries for call routing instructions, transmitted from DAP 110 through gateway 112. SCP 226 determines the need to vary traffic patterns according to the level and type of incoming calls, the time of day, day of the week, or day of the year. Rules reference lists containing ANI's (Automatic Number Identification) or CED's (Caller Entered Digits) to combine best fit routing with load balancing. Distribution of calls based on traffic patterns is well-known in the art, and for the sake of brevity will not be described in detail herein.

Load balancing among destinations is achieved in SCP 226 through an algorithm that estimates answering capacity of a destination by considering such factors as staffing plan information, the average handling time for a call, the number of available circuits per location per trunk, and information on termination availability. Termination availability may be modeled by SCP 226 (using histories of where SCP 226 has routed calls) or is calculated using near real-time ACD statistics. As shown in FIG. 2, ACD Statistics and GSE Trigger Point Alarms, shown generally at 234, are provided to SCP 226 from IR Host 116. The algorithm considers the tolerable answering delay for each termination under its routing control and apportions calls across terminations according to the ability of each termination to process additional calls.

In the context of the present invention, SCP 226 receives a notification of operator availability status, shown generally at 236, from IR Host 116. To generate Operator Notification 236, IR Host 116 first accesses a Force Management Database to determine which operators are scheduled to work or be "on duty" to receive calls. The Force Management Database is a static database, preferably resident within IR Host 116, that maintains the working schedule of all of the operators. By accessing the Force Management Database, IR Host 116 first identifies a set of on-duty operators that are scheduled to work at the time a current call is received. Operator availability status information pertaining to this set of on-duty operators is forwarded from IR Host 116 to SCP 226 so that SCP 226 can identify an available on-duty operator to answer the current call. Operator Notification 236 includes operator availability status information regarding on-duty Home Operators 126 that IR Host receives from NIC 108. Operator Notification 236 also includes operator availability status information regarding on-duty CS/OC Operators 124 that IR Host receives from ACD 120. Based on the operator availability status information, SCP 226 identifies an available operator that can answer a customer service call from customer 102. SCP 226 instructs DAP 110, through gateway 112, to route the customer service call to the identified available operator. This is shown generally in FIG. 2 by Call Route Request and Response 206 that is transmitted from SCP 226 to gateway 112, and from gateway 112 to DAP 110.

SCP 226 also generates alarm data, shown generally at 220, that are transmitted to an Alarm Management System 218. The alarm data include system level alarms and application alarms.

(b) Gateway 112

Gateway 112 is a call processing interface to control routing of customer calls. A call requiring special call routing instructions, such as a customer service call, is associated with an ICR trigger point. When DAP 110 encounters an ICR trigger point, it requests special call routing instructions from gateway 112. Gateway 112 forwards the request to SCP 226 for additional routing information pertaining to that call. The ICR trigger points are defined within a routing plan configuration, shown generally at 230. The routing plan configuration is maintained in a Network Capabilities System mainframe environment (NETCAP) 228, such as an IBM 3090. The routing plan configuration containing the ICR trigger points is passed to SCP 226 via real-time transactional updates. A Service Control Manager 232 provides routing plan configuration 230 to DAP 110. SCM 232 functions as a routing database control manager for the network DAP's. An exemplary SCM 232 is a VAX 7620 or a DEC Alpha.

(c) IR Host 116

IR Host 116 collects, stores, and processes DAP Traffic Statistics received from GSE 208, ACD Statistics (shown generally at 217), as well as information regarding the status of available operators. IR Host 116 uses a common configuration database to maintain a current configuration as seen by DAP 110, GSE 208, ACD 120, and SCP 226. IR Host 116 manages real-time communications to an ICR Customer Element (ICE) 214 for collection of ACD Statistics 217, and to SCP 226 for transmission of ACD Statistics and DTS Trigger Point Alarms 234 and Operator Notification 236. IR Host 116 also provides alarm data 220 to Alarm Management System 218. IR Host 116 provides information to SCM 232 regarding call routing allocation, shown at 222. IR Host 116 supports an IR Host Terminal 210, a VAX workstation used for administering IR Host 116 and ICE 214, and entering configuration data. An exemplary IR Host 116 is a cluster of VAX 7610 computers.

(d) ICR Customer Element (ICE) 214

ICE 214 functions as an interface to ACD's 120 which are typically located on the premise of a network customer, such as at a Customer Service/Operator Center (CS/OC). ICE 214 receives ACD data, shown generally at 216, from one or more ACD's 120. ICE 214 processes and formats ACD data 216, and forwards ACD Statistics 217 to IR Host 116. ICE 214 may be configured as one or more computers or processors, such as those manufactured by VAX. ICE 214 interfaces with a variety of ACD's, such as a Rockwell Galaxy, AT&T Generic 2 & 3, and Meridian SL-1.

Figure 3:
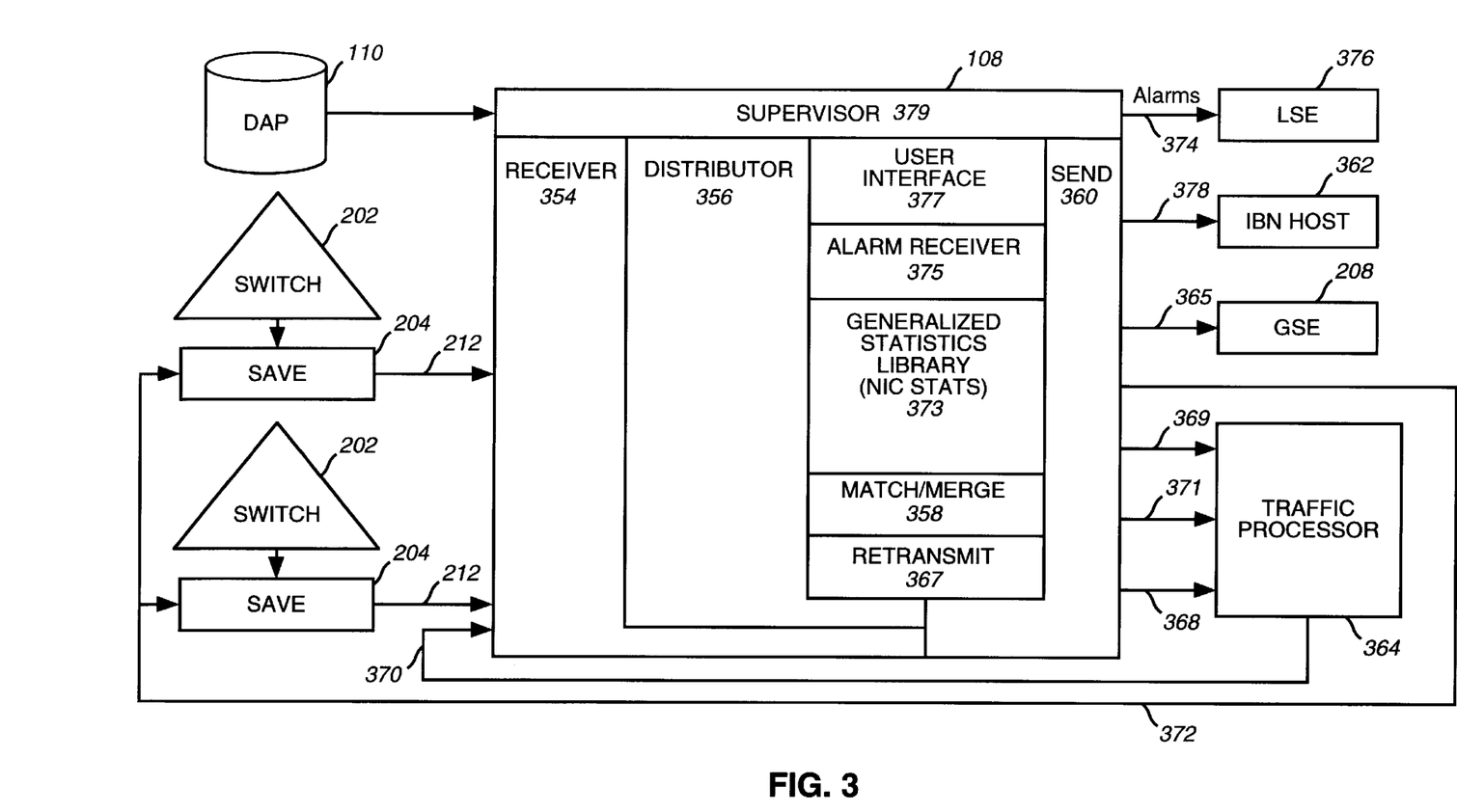
FIG. 3 shows a more detailed block diagram that illustrates the system architecture for the network information concentrator.

Turning now to FIG. 3, a more detailed block diagram is shown that illustrates the system architecture for NIC 108. A particularly preferred configuration for NIC 108 is described in co-pending U.S. patent application Ser. No. 08/426,256, the entirety of which is incorporated herein by reference. NIC 108 is configured to communicate with DAP 110 and SAVE 204. Although NIC 108 is shown as a single functional unit, it is preferably configured as a distributed processor, such as a cluster of IBM RS 6000 units, Model R24.

NIC 108 collects CDR 212 from SAVE 204, as previously indicated with respect to FIG. 2. CDR data is obtained from the network which is involved in the path of a call. CDR 212 is input to a receiver section 354 of NIC 108. Receiver section 354 provides the necessary handshaking signals with the various network elements that input data to NIC 108. For example, receiver section 354 provides handshaking signals with SAVE 204 to receive CDR 212. Receiver section 354 also provides handshaking signals with DAP 110. As explained more fully below, DAP 110 sends a call routing message that is received by NIC 108. The call routing message is issued after DAP 110 routes a call to an operator. The call routing message indicates that the operator to whom the call was routed is now busy, i.e., has a status of non-available. The succeeding NIC section, a distributor 356, identifies the type of record or information being processed by NIC 108.

A match/merge processor 358 of NIC 108 performs a match/merge operation of the records generated by network elements. As a result, when a particular call is handled by various elements in the network, the call records are merged by match/merge processor 358 so that they may be forwarded as a matched operator service record to an intelligent service network (ISN) host 362. For example, match/merge processor 358 matches operator service record elements with billing data record elements of the same type of call. As an example, an operator assisted long distance call has two types of billing records produced from two separate platforms. Match/merge processor 358 concatenates (merges) the elements for downstream billing applications. In order to complete a communication path between match/merge processor 358 and ISN host 362, a send section 360 of NIC 108 communicates call records to ISN host 362 via a line 378.

Call records are also sent from NIC 108 to generalized statistics engine (GSE) 208 that produces statistical counts of a pre-selected nature on the call records. A communications line between send section 360 of NIC 108 and the input of GSE 208 is indicated by reference numeral 365.

A traffic processor 364 is provided for collecting all call record data. In the event traffic processor 364 detects missing call record data, it generates a re-transmission request along a line 370. The request is received at receiver section 354 of NIC 108, which will re-transmit the requested call record data, if it is present in NIC 108. Otherwise, NIC 108 generates the corresponding re-transmission request along a line 372, which is fed back to the adjunct processors that store past call record data. Upon receipt of such a re-transmission request by SAVE 204, it re-transmits the requested missing call record data to receiver section 354 of NIC 108. The re-transmission of requested missing call records is handled through a re-transmit section 367 of NIC 108. All call record data is received by traffic processor 364 from send section 360 of NIC 108 via a line 369. Traffic processor 364 also receives statistics concerning NIC event records (NERs) 371. NER 371 are provided by a statistics library section 373 of NIC 108 that receives specific call records from SAVE 204. In the event that the requested missing call record data is unavailable from either NIC 108 or SAVE 204, a failed re-transmission request signal is generated on a line 368 of traffic processor 364.

An alarm server 375 monitors the operation of the adjunct processors and the network elements. In the event of a malfunction or alarm condition, an appropriate signal is sent to a network management platform (LSE 376) via a line 374. LSE 376 performs conventional network management functions.

The timing for all communication between the network elements, the NIC sections, and the platforms and processors connected to the output of NIC 108 are handled by a distributed processor supervisor section 379 of NIC 108. Supervisor section 379 also inputs commands issued from a user interface section 377 that require supervisor section action. User interface section 377 is a collection of processes that facilitates the user access to the NIC subsystems. In addition to facilitating user access to the various NIC subsystems, user interface section 377 implements NIC security controlling user access to NIC resources.

Figure 10:
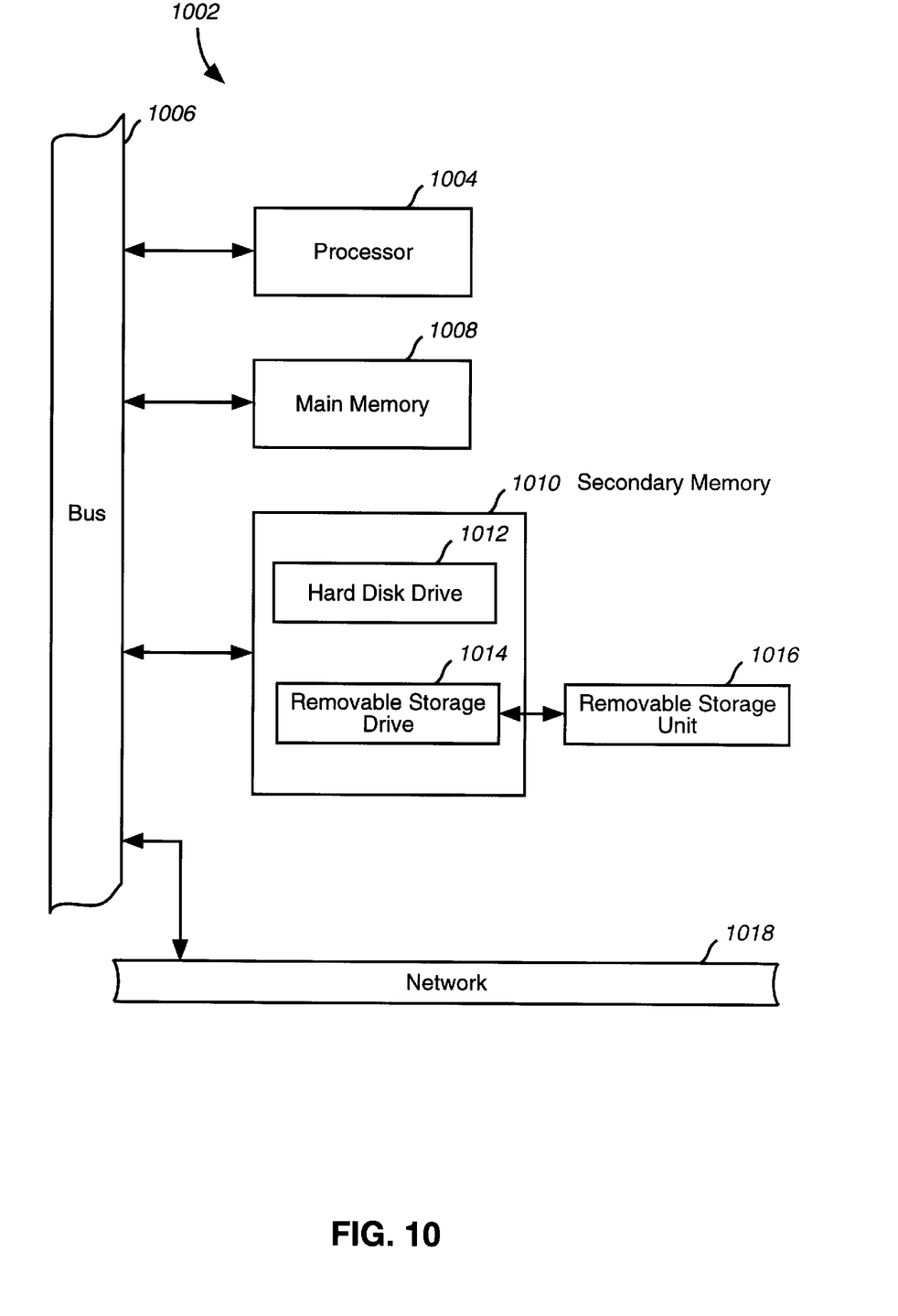
FIG. 10 shows an exemplary computer system for use in the present invention.

An exemplary computer system 1002 that may be used as components in the present invention is shown in FIG. 10. Computer System 1002 includes one or more processors, such as processor 1004. Processor 1004 is connected to a communication bus 1006. Computer System 1002 may communicate with other similarly configured computer systems via a network 1018.

Computer system 1002 also includes a main memory 1008, preferably random access memory (RAM), and a secondary memory 1010. Secondary memory 1010 includes, for example, a hard disk drive 1012 and/or a removable storage drive 1014, representing a floppy disk drive, a magnetic tape drive, a compact disk drive, etc. Removable storage drive 1014 reads from and/or writes to a removable storage unit 1016 in a well known manner.

Removable storage unit 1016, also called a program storage device or a computer program product, represents a floppy disk, magnetic tape, compact disk, etc. As will be appreciated, removable storage unit 1016 includes a computer usable storage medium having stored therein computer software and/or data.

Computer programs (also called computer control logic) are stored in main memory and/or secondary memory 1010. Such computer programs, when executed, enable computer system 1002 to perform the features of the present invention as discussed herein. In particular, the computer programs, when executed, enable processor 1004 to perform the features of the present invention. Accordingly, such computer programs represent controllers of computer system 1002.

One embodiment of the present invention is directed to a computer program product comprising a computer readable medium having control logic (computer software) stored therein. The control logic, when executed by processor 1004, causes processor 1004 to perform the functions of the invention as described herein.

3. System Operation

Figure 4:
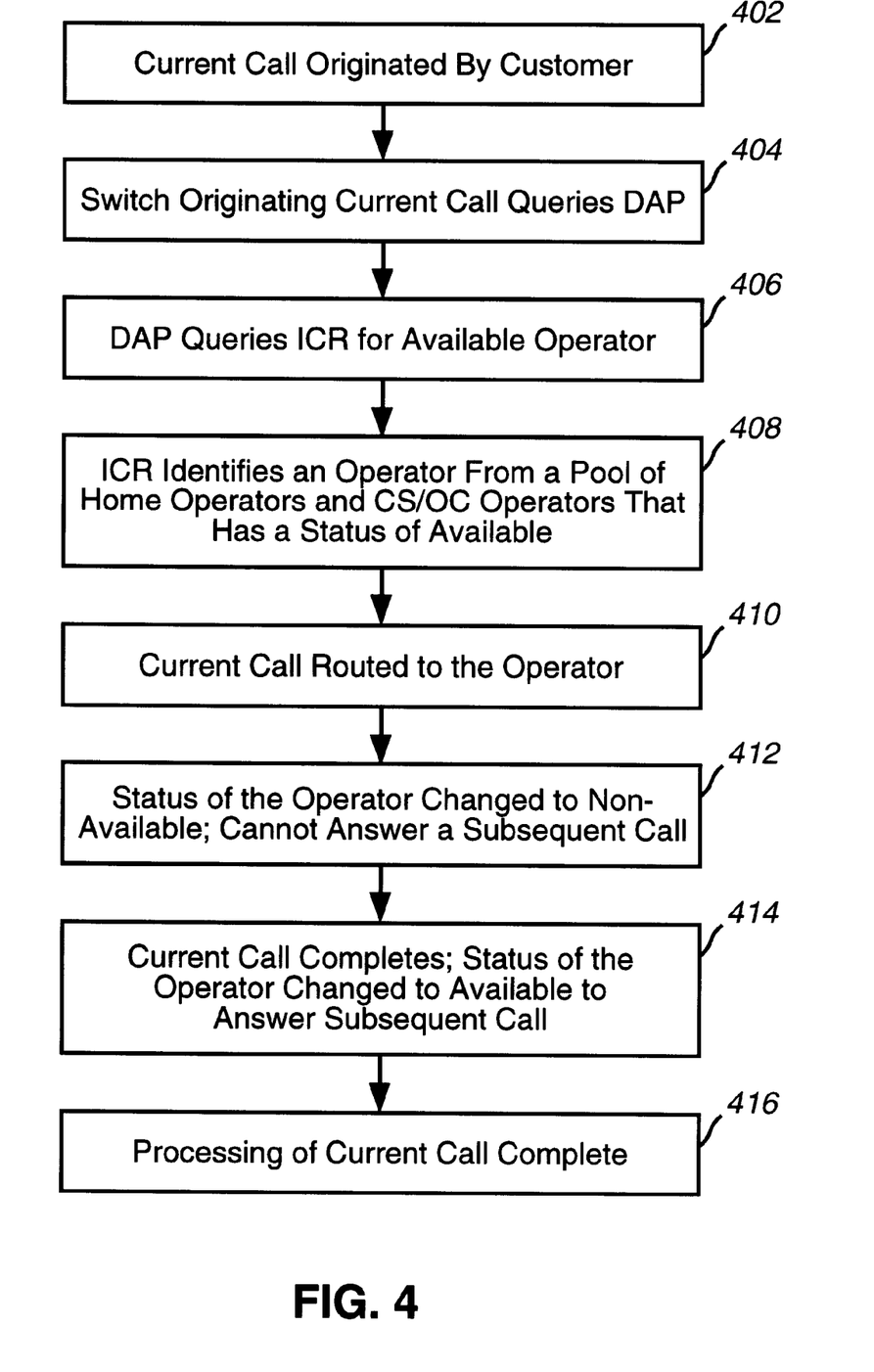
FIG. 4 shows a process flowchart that illustrates the operation of the method of the present invention for distributing calls among a plurality of operators.

Referring to FIG. 4, a process flowchart is shown that illustrates the operation of the method of the present invention for distributing calls among a plurality of operators. In a step 402, a current call, such as a customer service call, is originated by customer 102. In a step 404, originating switch 106 that originates the current call queries DAP 110. In a step 406, DAP 110 recognizes the current call as one requiring further routing instructions, and queries ICR 114 for additional call routing instructions, i.e., to identify an available operator to answer the current call. In a step 408, ICR 114 identifies an operator from a pool of Home Operators 126 and CS/OC Operators 124 that has a status of "available." ICR 114 makes this identification based on route plan configuration data provided to SCP 226, as well as operator availability information provided to SCP 226 by IR Host 116. By accessing the Force Management Database, IR Host 116 first identifies a set of on-duty operators that are scheduled to work at the time a current call is received. Operator availability status information pertaining to this set of on-duty operators is forwarded from IR Host 116 to SCP 226 so that SCP 226 can identify an available on-duty operator to answer the current call. IR Host 116 receives on-duty Home Operator availability information from NIC 108 (element 134 in FIG. 1) and on-duty CS/OC Operator availability information from ACD 120 (element 132 in FIG. 1).

In a step 410, the current call is routed to the operator identified as available by ICR 114. The status of the operator to whom the current call was routed in step 410 is changed to non-available in a step 412. Changing the status of the operator to non-available indicates that the operator cannot answer a subsequent call. When the current call completes in a step 414, the status of the operator is changed to available, indicating that the operator can answer a subsequent call. The processing of the current call is then complete as indicated in a step 416. The system repeats the steps indicated in FIG. 4 for each customer service call originated by customer 102.

Figure 5:
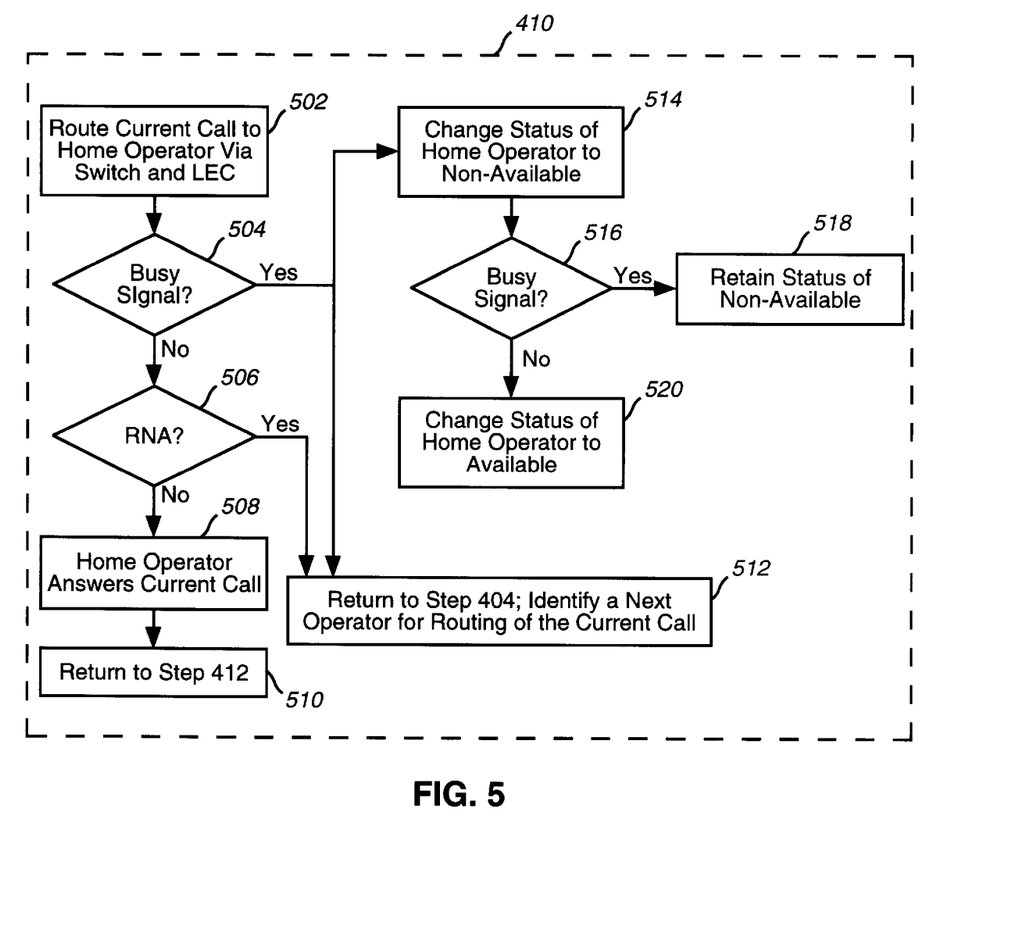
FIG. 5 shows an embodiment for carrying out step 410 in FIG. 4.

FIG. 5 shows one embodiment for carrying out step 410 in FIG. 4. In the embodiment shown in FIG. 5, the current call is routed to Home Operator 126 via terminating switch 118 and LEC 122 in a step 502. To perform this call routing, ICR 114 responds to DAP 110 with the termination number for the identified Home Operator. This number may be a Direct Distance Dialing (DDD) number, an 800 number, or a private dialing plan number. DAP 110 translates the number to a termination routing identification, and instructs originating switch 106 to route the call appropriately, i.e., through terminating switch 118 and LEC 122 to the identified Home Operator 126.

In a step 504, a determination is made whether a busy signal condition exists for the identified Home Operator. If the busy signal condition does not exist, a determination is made in a step 506 whether a ring-no-answer (RNA) condition exists for the identified Home Operator. If the RNA condition does not exist, the identified Home Operator answers the current call in a step 508. The process returns to step 412 in FIG. 4 as indicated in a step 510.

If either the busy signal condition (step 504) or the RNA condition (step 506) exist, a step 512 is performed that returns the process to step 404 so that a next operator can be identified for routing of the current call. The call flow for the busy signal condition and the RNA condition is the same. The call is released back to originating switch 106. Originating switch 106 queries DAP 110 again for call routing instructions (step 404). DAP 110 queries ICR 114 for an available operator (step 406), and an available operator for the current call is identified in step 408.

If the busy signal condition is detected in step 504, steps 514 through 520 are performed in addition to step 512. In step 514, the status of the Home Operator is changed to non-available. The busy signal condition is periodically checked in a step 516 to determine if the busy signal condition still exists. The status of non-available is retained as long as the busy signal condition exists, as shown in step 518. Once the busy signal condition is no longer detected, the status of the Home Operator is changed to available, as shown in step 520.

Once a call is routed to a Home Operator, the status of that Home Operator is changed to non-available. This happens whether or not the Home Operator answers the call, or a RNA or busy signal condition is encountered. Steps 410 and 412 are essentially concurrently performed.

Figure 6:
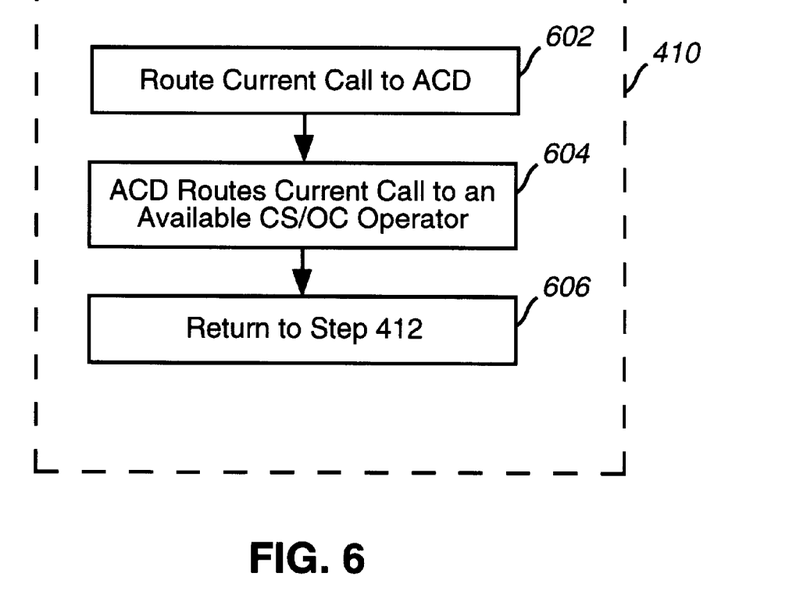
FIG. 6 shows another embodiment for carrying out step 410 in FIG. 4.

An alternate embodiment for carrying out step 410 in FIG. 4 is shown in FIG. 6. In the embodiment shown in FIG. 6, the current call is routed to CS/OC Operator 124 via ACD 120. In a step 602, the current call is routed to ACD 120. In a step 604, ACD 120 routes the current call to an available CS/OC Operator 124. ACD 120 also provides queuing to incoming calls when no operators are currently available. In a step 606, the process returns to step 412 in FIG. 4.

Figure 7:
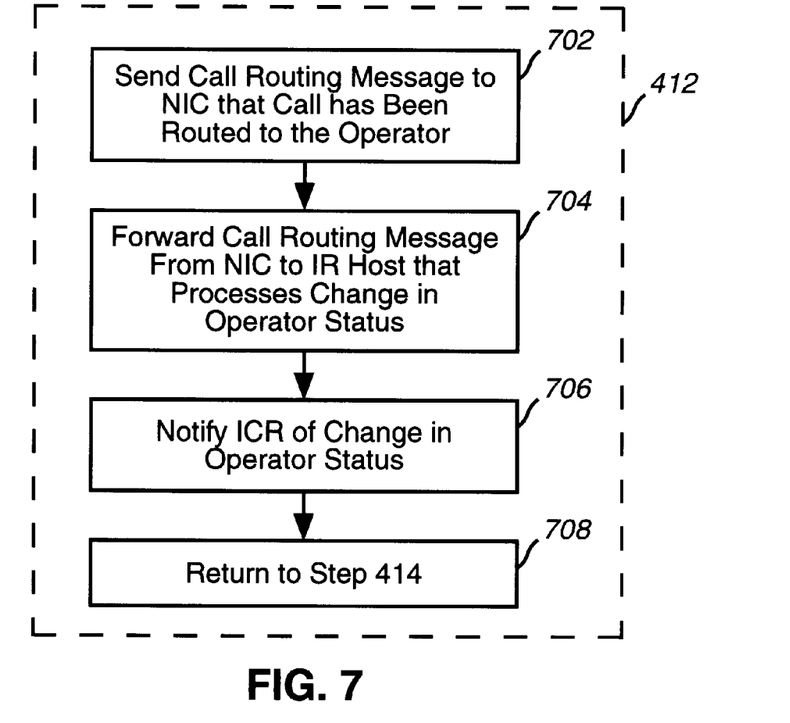
FIG. 7 shows an embodiment for carrying out step 412 in FIG. 4.

FIG. 7 shows an embodiment for carrying out step 412 in FIG. 4 in which the status of the operator is changed to non-available. After DAP 110 routes the current call to the operator in step 410, DAP 110 sends a call routing message to NIC 108 that the call has been routed to the operator, as shown in a step 702. NIC 108 forwards the call routing message to IR Host 116 in a step 704. IR Host 116 processes the call routing message, and changes the status of the operator to be non-available. The status of the operator remains non-available until IR Host 116 receives a subsequent message to change the status to available. In a step 706, IR Host 116 notifies ICR 114 of the change in status of the operator. In a step 708, the process returns to step 414 in FIG. 4.

Figure 8:
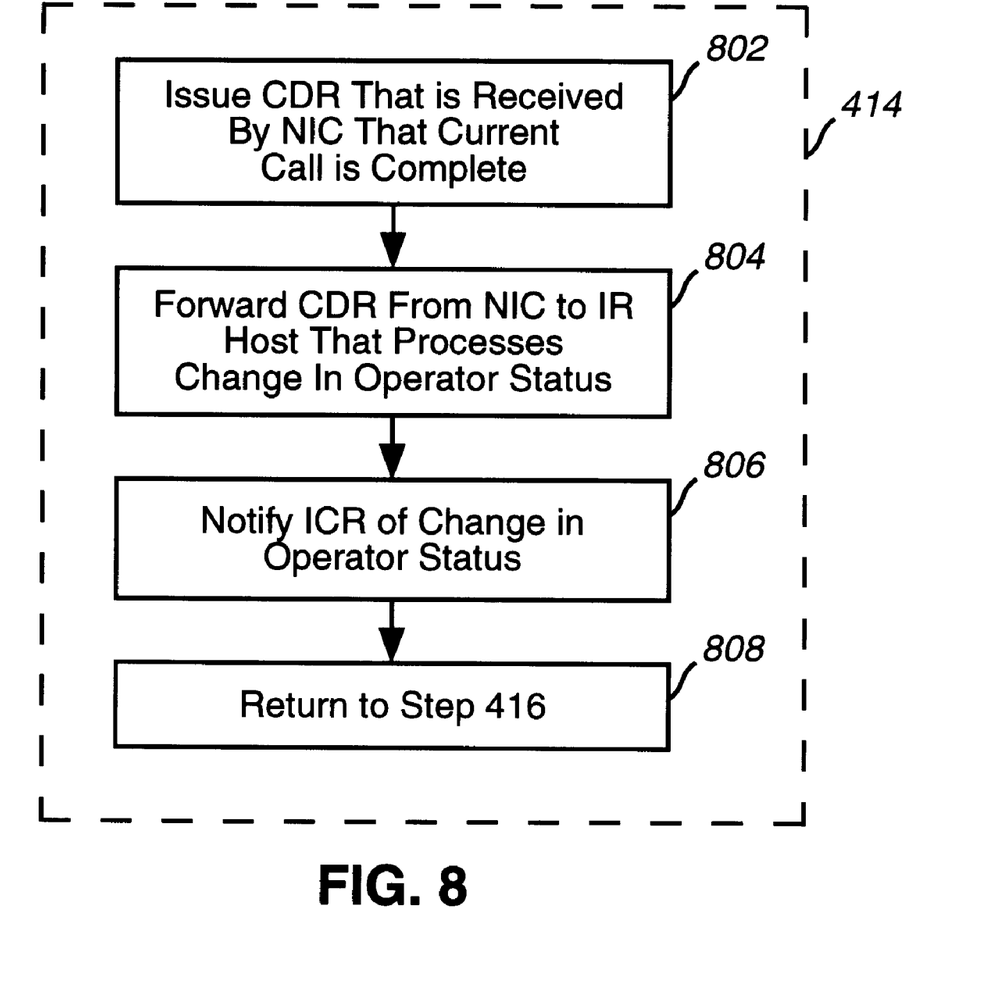
FIG. 8 shows an embodiment for carrying out step 414 in FIG. 4.

FIG. 8 shows an embodiment for carrying out step 414 in FIG. 4, in which the current call completes and the status of the operator is changed to available. In a step 802, a Call Detail Record (CDR) is issued by originating switch 106, and received by NIC 108, that indicates the current call is complete. When the current call from customer 102 is complete, originating switch 106 issues a CDR that contains the destination for that call. The CDR is forwarded from NIC 108 to IR Host 116 in a step 804. Because CDR's are issued upon completion of the call, IR Host 116 reads the destination of the completed call in the CDR. This informs IR Host 116 that the operator to whom the current call was routed is now available since the current call is complete. IR Host 116 processes the change in status of the operator (from non-available to available) in step 804. In a step 806, IR Host 116 notifies ICR 114 of the change in status of the operator. In a step 808, the process returns to step 416 in FIG. 4.

By using the method of the present invention, only a single telephone line is needed from LEC 122 to Home Operator 126. This single telephone line can be used exclusively for providing customer service. A separate second telephone line is not needed to notify the network of operator availability because the network is automatically monitoring availability and status of the Home Operator. The method of the present invention also eliminates the need for the Home Operator to provide notification of their availability.

Figure 9:
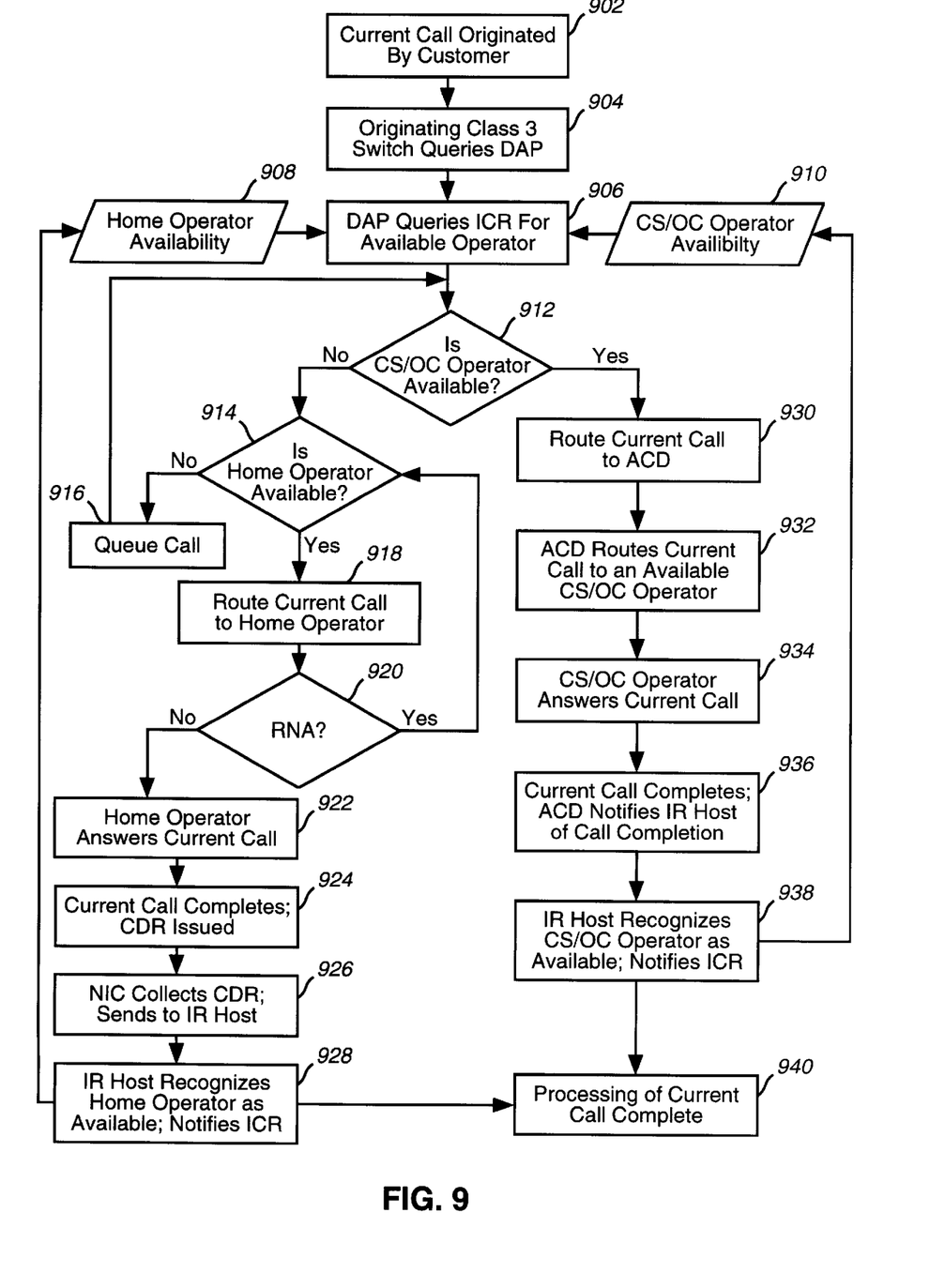
FIG. 9 shows a process flowchart that illustrates an embodiment of the present invention when calls are routed to Home Operators as overflow from a Customer Service/Operator Center.

As a further example of the method of the present invention, FIG. 9 illustrates an embodiment of the present invention when calls are routed to Home Operators as overflow from a Customer Service/Operator Center (CS/OC). This method allows a company to minimize the facilities and staffing needed for the CS/OC, thereby reducing costs associated with operation of the center.

In a step 902, a current call is originated by customer 102. Customer 102 calls the designated customer service number, and is connected to originating switch 106 via LEC 104. In a step 904, originating switch 106 queries DAP 110 to obtain call routing instructions. In a step 906, DAP 110 recognizes the call as one requiring further call routing instructions, and queries ICR 114 to determine where to route the call, i.e., to identify an available operator to answer the call. ICR 114 makes this determination based on route plan configuration data provided to SCP 226, as well as operator availability information provided to SCP 226 by IR Host 116. Home Operator availability information is shown generally in FIG. 9 as 908. CS/OC Operator availability information is shown generally in FIG. 9 as 910.

In the example illustrated in FIG. 9, Home Operators are being used as overflow operators for a CS/OC. As such, the process first determines in a step 912 whether a CS/OC Operator is available. If a CS/OC Operator is not available, the process proceeds to a step 914 in which ICR 114 determines if a Home Operator is available. Since this determination may be iterative, depending on the outcome of a step 920, ICR 114 looks for the next available Home Operator.

If a Home Operator 126 is not available, as determined in step 914, the current call is placed in a queue, as indicated in a step 916. This queue may be an on-hold condition or a voice mail message, and may be implemented in ACD 120, a Class 3 Switch, or a conventional Audio Response Unit. The process proceeds back to step 912 in which ICR 114 determines if a CS/OC Operator has recently been made available. ICR 114 identifies a next operator that has a status of available, and routes the current call to that next available operator.

If a Home Operator 126 is available, as determined in step 914, the current call is routed to the identified Home Operator in a step 918. To perform this call routing, ICR 114 responds to DAP 110 with the termination number for the identified Home Operator. This number may be a Direct Distance Dialing (DDD) number, an 800 number, or a private dialing plan number. DAP 110 translates the number to a termination routing identification, and instructs originating switch 106 to route the call appropriately, i.e., through terminating switch 118 and LEC 122 to the identified Home Operator 126.

When the current call reaches Home Operator 126, a Ring-No-Answer (RNA) condition may exist if for some reason the Home Operator does not answer the call after a certain number of rings. If an RNA condition exists, as determined in a step 920, the process returns to step 914, and ICR 114 proceeds to check for the next available operator.

If no RNA condition exists, as determined in step 920, the Home Operator answers the current call, as indicated in a step 922. At the end of the current call, one of the parties (customer 102 or Home Operator 126) hangs up, and the call is complete. As shown in a step 924, once the current call completes, originating switch 106 issues the CDR for the current call. The CDR contains, among other data, the called party and whether the called party answered. This data is used by the present invention to determine which operators are available; the fact that the CDR issued means that the call has completed. In a step 926, NIC 108 collects the CDR and sends it to IR Host 116.

In a step 928, IR Host 116 recognizes that Home Operator 126 is available, based on receipt of the most recent CDR. IR Host 116 notifies ICR 114 of the change in status of the Home Operator (from non-available to available). Home Operator availability information 908 is updated to reflect this change in status. Information 908 is used by ICR 114 in step 906 to determine which operators are available. After completing step 928, processing of the current call is complete, as shown in a step 940.

If ICR 114 determines in step 912 that a CS/OC Operator 124 is available, ICR 114 responds to DAP 110 with the termination number for ACD 120. DAP 110 instructs originating switch 106 to route the call to ACD 120, as shown in a step 930. In a step 932, ACD 120 routes the current call to an available CS/OC Operator via the appropriate dedicated switch port. In a step 934, the available CS/OC Operator answers the current call. When the current call is complete, ACD 120 notifies IR Host 116 that the current call is complete, and that a CS/OC Operator is now available, as shown in a step 936. The notification from ACD 120 to IR Host 116 preferably is via a data feed from the printer port of ACD 120.

In a step 938, IR Host 116 recognizes that the CS/OC Operator is now available, based on receipt of the ACD data feed. IR Host 116 notifies ICR 114 of the change in status of the CS/OC Operator (from non-available to available). CS/OC Operator availability information 910 is updated to reflect this change in status. Information 910 is also used by ICR 114 in step 906 to determine which operators are available. After completing step 938, processing of the current call is complete, as indicated in step 940.

4. Conclusion

While various embodiments of the present invention have been described above, it should be understood that they have been presented by way of example only, and not limitation. For example, the present invention could also be used to implement a distributed workforce of employees working from home. The system and method of the present invention could be used to provide voice and/or data communication with such a distributed workforce. As a further example, various other telephone number types, in addition to "1-800" numbers, may be used for customer service access. Home Operators may be used in combination with CS/OC Operators, as overflow for CS/OC Operators, or entirely exclusive of CS/OC Operators. Home Operators may be accessed via a DAL rather than a FGD line connected to a LEC. Home Operators may also be accessed by a "1-800" number or private dialing plan number, rather than by a DDD number. The network platform for the present invention may be provided by a LEC or other telecommunications service provider, or by an Interexchange Carrier (IXC). The ACD may be owned by the company providing customer services, or it may be owned by a telecommunications service provider. Thus, the breadth and scope of the present invention should not be limited by any of the above-described exemplary embodiments, but should be defined only in accordance with the following claims and their equivalents.

What is claimed is:

1. A method for distributing calls among a plurality of operators, comprising:

processing call detail records automatically generated from a switch and call routing messages automatically generated from a call routing means to determine if any of a plurality of customer service/operator center operators are available;

upon ascertaining the unavailability of an operator from among the plurality of customer service/operator center operators as determined by the call detail records and call routing messages, checking the availability of a home operator by querying a call routing number associated with said home operator's telephone;

routing the current call to an available home operator via a single voice line, and periodically querying the call routing number associated with said home operator's telephone to determine the availability of the home operator to accept another call.

2. The method of claim 1, further including the steps of:

determining if a ring-no-answer condition exists for the home operator; and if the ring-no-answer condition exists for the home operator,
identifying a next operator that has a status of available and routing the current call to the next operator.

3. The method of claim 1, further including the the steps of:

determining if a busy signal condition exists for the home operator, indicating that the home operator is on a local exchange carrier call; and if the busy signal condition exists for the home operator, identifying a next operator that has a status of available and routing the current call to the operator;
changing the status of the home operator to non-available indicating that the home operator cannot answer a subsequent call;
periodically checking to determine if the busy signal condition exists for the home operator; and when the busy signal condition no longer exists, changing the status of the home operator to available indicating that the home operator is available to answer the subsequent call.

4. The method of claim 1, wherein an automatic call distributor indicates the customer service/operator center operator is not available by forwarding a message to an intelligent routing host that processes the change in status of the customer service/operator center operator, and notifying a call routing system of the change in status of the customer service/operator center operator, and routing the current call to the home operator.

5. The method of claim 2, further including the steps of:

changing the status of the home operator to non-available indicating that the home operator cannot answer a subsequent call;

periodically checking to determine if the ring-no-answer condition exists for the home operator; and when the ring-no-answer condition no longer exists, changing the status of the home operator to available indicating that the home operator is available to answer the subsequent call.

6. The method of claim 5, further including the steps of:

receiving a call routing message indicating that the current call has been routed to the operator;

processing the call routing message to change the status of the operator from available to non-available; and notifying a call routing system of the change in status of the operator.

7. The method of claim 5, further including the steps of:

receiving a call detail record indicating completion of the current call by the operator;

processing the call detail record to change the status of the operator from non-available to available; and notifying a call routing system of the change in status of the operator.

8. The method of claim 6, further including the steps of:

receiving a call detail record indicating completion of the current call by the operator;

processing the call detail record to change the status of the operator from non-available to available; and notifying the call routing system of the change in status of the operator.

* * * * *